United States Patent [19]

Atchley et al.

[11] 4,184,450
[45] Jan. 22, 1980

[54] FOOD HOLDER FOR SMALL ANIMALS

[75] Inventors: Frank W. Atchley; Donald W. Vorbeck, both of Napa, Calif.

[73] Assignee: Atco Manufacturing Co., Inc., Napa, Calif.

[21] Appl. No.: 857,227

[22] Filed: Dec. 5, 1977

[51] Int. Cl.² .................................................. A01K 5/00
[52] U.S. Cl. ..................................... 119/51 R; 119/18
[58] Field of Search ................................. 119/51 R, 18

[56] References Cited

U.S. PATENT DOCUMENTS

| 711,170 | 10/1902 | Michaelson | 119/51 R |
| 2,727,489 | 12/1955 | Sklar | 119/51 R |
| 3,602,196 | 8/1971 | Tucci | 119/51 R |

FOREIGN PATENT DOCUMENTS 16307 of 1905 United Kingdom .................. 119/51 R

*Primary Examiner*—Jay N. Eskovitz
*Attorney, Agent, or Firm*—James R. Cypher

[57] ABSTRACT

A device for holding a hard, molded food item for caged small animals, constructed from sheet metal, including a holder portion formed with a plurality of openings for providing access to the food and a hanger member connected to the holder and provided with means for attachment to a cage. The holder is formed with a top loading opening. The hanger is formed with means for supporting and holding the ends of the holder together.

3 Claims, 7 Drawing Figures

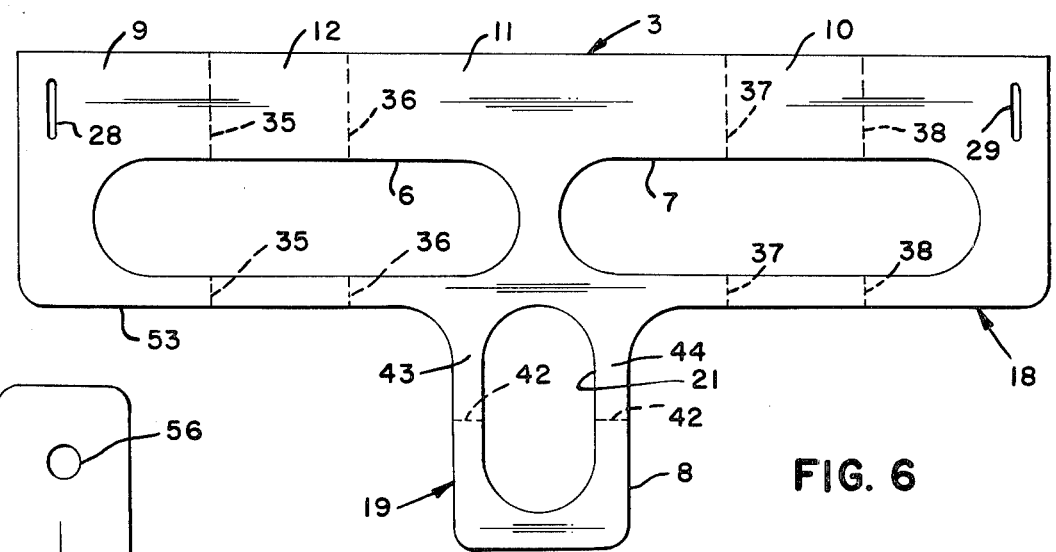
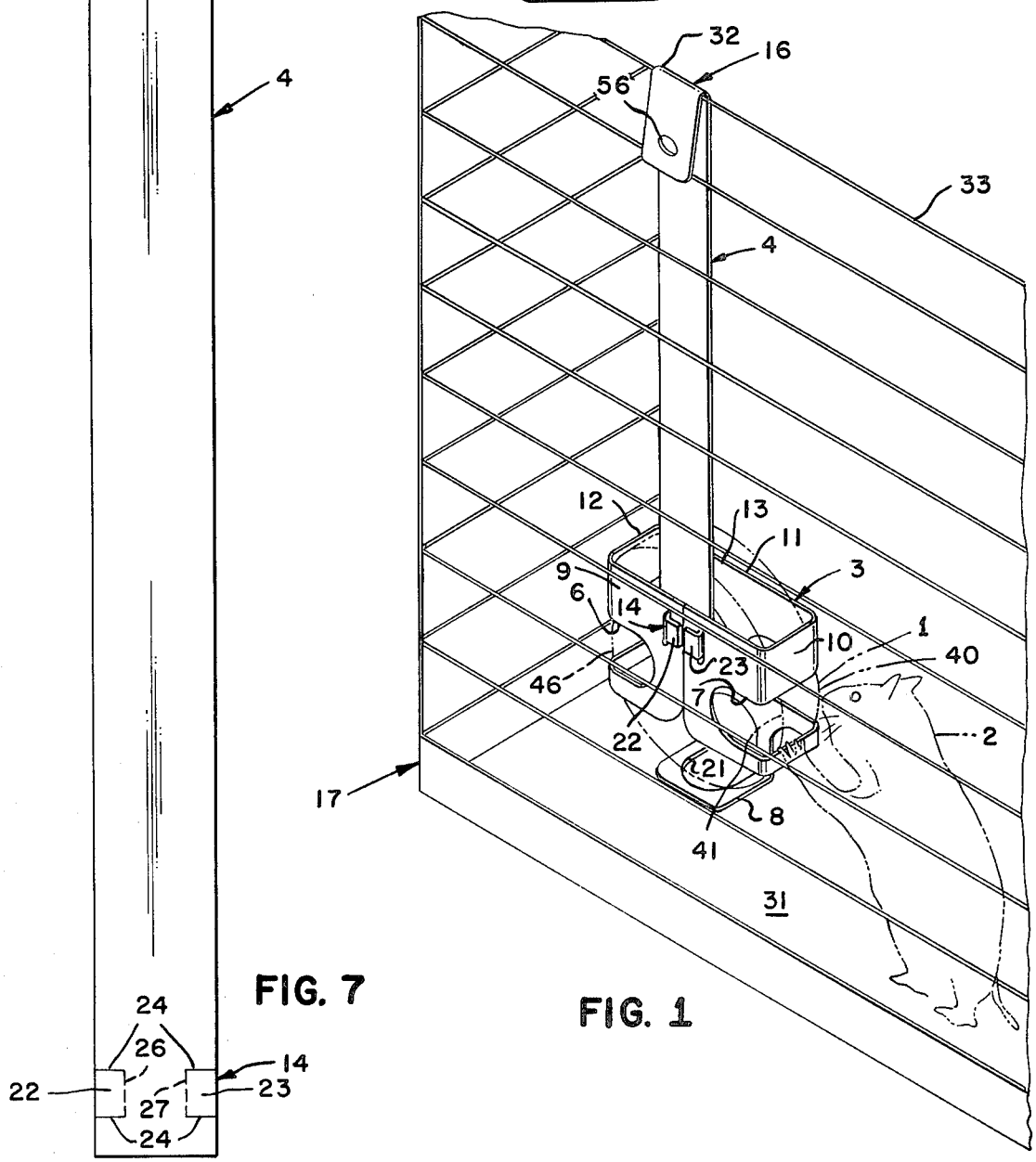

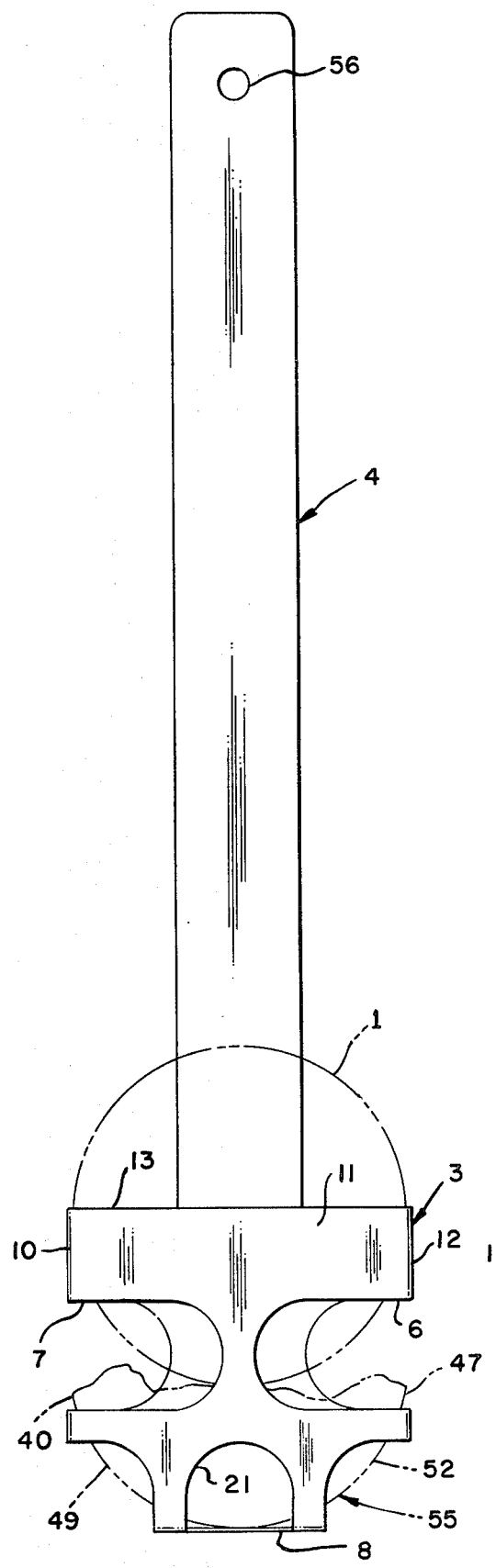
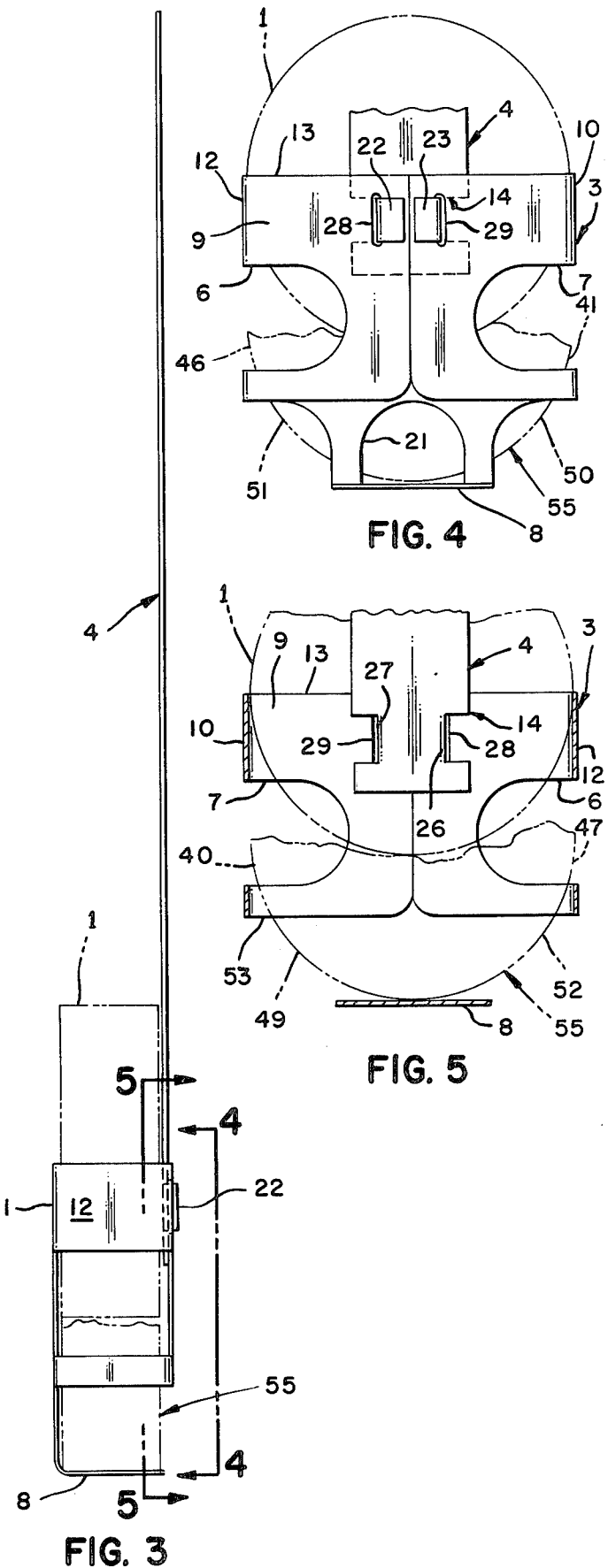

FOOD HOLDER FOR SMALL ANIMALS

BACKGROUND OF THE INVENTION

Caged small animals such as hamsters, gerbils, mice, rats, chipmunks are normally fed dry solid food such as seeds, bone meals, soy four, rice brans, etc., in open dish containers. The food is usually a loose mixture purchased in bulk at pet stores and only a single serving of food is placed in the open dish since small animals tend to play with their food, spilling and kicking it out of the dish and into their cage. Much food is wasted from littering and animal contamination.

Open dishes take up valuable space in small cages and the animals walk or sleep in their food dishes causing food spoilage due to the poor sanitation and molding of the food.

Small animals have very sharp teeth and in fact they must gnaw on objects to prevent their teeth from becoming too large. Rats which do not have objects to chew on can actually develop fangs which interfere with the animal's ability to properly chew their food. Plastic or other soft dishes cannot be used since the animals chew on them until they are unusable.

SUMMARY OF THE INVENTION

The gist of the present invention is the construction of a food holder from sheet metal having a thickness so that the small animals, under ordinary circumstances will not destroy the holder by chewing on it.

An object of the invention is to provide a holder which can hold a supply of several days food above the floor of the cage so that the animals will not normally contaminate the food or litter the cage with food pieces.

A further object is to provide a holder which will permit the animals to gnaw on the food item with a minimum of interference so that they will not become frustrated and gnaw on the holder, yet the holder has sufficient structure to hold the food item even when it has been reduced to one or more small sections.

Still another object is to provide a holder which can hold a partially eaten food item and an uneaten item which will automatically drop into the basket when the small piece has been nearly or completely consumed.

A still further object is to provide a holder which will not hold liquids to prevent molding of the food.

Another object is to provide a hanger which can be attached to a cage easily and securely and at varying elevations to accommodate animals of different size.

Still another object is to provide a hanger which will not only serve to attach the holder but will also serve to hold the sides of the holder together.

Another object is to provide a holder which may be constructed without welds or rivets.

DESCRIPTION OF THE DRAWINGS

FIG. 1 is a perspective view of the device constructed in accordance with the present invention placed in a wire cage. A small animal, shown in broken line, is shown eating a typical food item; also shown in broken line.

FIG. 2 is a front elevation view of the device.

FIG. 3 is a side elevation view of the device.

FIG. 4 is a rear elevation view of a portion of the device taken generally in the direction of line 4—4 of FIG. 3.

FIG. 5 is a cross sectional view taken along line 5—5 of FIG. 3.

FIG. 6 is an enlarged plan view of a sheet metal member prior to bending which may be formed into the shape of the food holder.

FIG. 7 is a plan view of the hanger member of the device prior to bending.

DESCRIPTION OF THE INVENTION:

The device of the present invention for holding a molded food item 1 for small animals 2 consists of a sheet metal holder member 3 and a hanger member 4. The holder member is formed with a plurality of openings 6 and 7 which are dimensioned so that the small animal can reach into the container and gnaw on the food. The holder is formed with a bottom wall 8, sidewalls 9, 10, 11 and 12 and an open top 13. Means 14 attach the hanger member to the holder member and means 16 attach the hanger to a support such as a cage 17.

As illustrated in FIG. 6, the sheet metal holder member is formed in the shape of a "T" having a cross member 18 and a stem member 19. Elongated openings 6 and 7 are formed in the cross member and an elongated opening 21 is formed in the stem member.

The hanger member is preferably made from a sheet metal member and formed with bendable tabs 22 and 23. The tabs may be formed by forming cuts 24 in the edges of the hanger and bending the tabs along bend lines 26 and 27. The holder member is formed with a pair of slots 28 and 29 for receiving tabs 22 and 23. The hanger is attached to the holder by simply inserting the tabs through the slots and bending the tabs along bend lines 26 and 27.

The device will fit cages of varying height and can be used to elevate the food at the proper distance above the floor 31 of the cage to accommodate animals of different sizes. The hanger member is made from a bendable metal so that to attach the device it is only necessary to bend the hanger along any line such as line 32 and hang the hanger over a wire 33 of the cage.

Preferably the holder is formed in the shape of a rectangle. This can be accomplished by bending the sheet metal at bend lines 35, 36, 37, and 38. By placing the bend lines as shown in FIG. 6 so that they are spaced from the ends of the openings, the openings may be located so that they occur at two opposed sides and all four corners. Thus the animal can easily gnaw on the edges 40 and 41 of the food item.

The opening in the stem portion is located so that by bending along bend line 42, the bottom wall 8 is attached to a side wall on one side only. As shown, thin portions 43 and 44 attach the bottom wall to the side of the holder.

As shown in the drawings, the animal can gnaw on the food item at edges 40 and 41 through opening 7 as shown in FIG. 1, or he can go around to the other side and gnaw on edges 46 and 47 on the other side. The animal could also gnaw on edges 49, 50, 51, and 52 through the opening formed between edge 53 and bottom wall 8.

An important advantage of the present invention is the fact that, as shown in FIGS. 2-5, after one food item 55 is partially eaten, a second item 1 may be placed in the open topped holder so that a constant food supply may be available to the animal even though the animal cannot be attended immediately after the first food item is completely consumed.

Since many small animals have teeth which can gnaw through thin metal, it is important to select a metal thickness which is sufficiently think to discourage the animal from gnawing through the metal instead of the food.

It would be possible to construct the holder in various ways. The method shown is economical to fabricate. The tabs on the hanger not only attach the hanger to the holder but they also hold the two ends of the holder together.

An opening 56 sufficient to receive a common nail may be formed in the hanger to attach the hanger above the floor of the cage.

We claim:

1. A device for holding a hard molded food item having edges which is to be consumed by small animals biting or gnawing said edges of said food item, formed of a blank of sheet metal, said blank comprising;
   a. a bottom wall forming panel 8;
   b. a thin portion backwall panel 43 and 44 attached to said bottom wall forming panel and defined therefrom by bend lines 42;
   c. sidewalls 11 attached to said backwall panels 43 and 44;
   d. sidewalls 10 and 12 attached to sidewall 11 and defined therefrom by bend lines 36 and 37;
   e. sidewalls 9 formed with attachment openings 28 and 29 and end edges attached to sidewalls 10 and 12 and defined therefrom by bend lines 35 and 38;
   f. an elongated hanger member 4 formed with attachment means for connection to said attachment openings 28 and 29 in said sidewalls 9;
   g. said bottom wall forming panel 8 being proportioned and positioned when assembled to underlie said thin portion backwall panel 43 and 44 and spaced from said sidewalls 11, 10, 12 and 9 when said blank is folded on said bend line 42 and adapted to support and expose said edges of said food item; and
   h. said sidewalls being proportioned and positioned when assembled to form a continuous sidewall except at the end edges of said sidewalls 9 and adapted to laterally hold said food item.

2. A device for holding a food item as described in claim 1 comprising;
   a. said bottom wall and thin portion backwall panel are formed with an elongated opening 21; and
   b. said sidewalls are formed with elongated openings 6 and 7.

3. A device for holding a food item as described in claim 2 comprising;
   a. said hanger member 4 is formed with tabs 22 and 23 for engaging openings 28 and 29.

* * * * *